United States Patent
Hirst et al.

(10) Patent No.: US 7,541,692 B2
(45) Date of Patent: Jun. 2, 2009

(54) PERIPHERAL DEVICE HAVING A POWER SUPPLY

(75) Inventors: B. Mark Hirst, Boise, ID (US); Tony Barrett, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/304,405

(22) Filed: Nov. 26, 2002

(65) Prior Publication Data

US 2004/0103326 A1 May 27, 2004

(51) Int. Cl.
*H02J 1/10* (2006.01)
*H02J 3/38* (2006.01)
*H02J 7/34* (2006.01)

(52) U.S. Cl. .......................................... 307/44; 307/46
(58) Field of Classification Search .................. 307/154, 307/44, 46; 700/286, 295, 297; 713/300; 399/88–89
See application file for complete search history.

(56) References Cited

U.S. PATENT DOCUMENTS

| 4,110,670 | A | * | 8/1978 | Araki et al. ................... 318/757 |
| 5,260,855 | A | * | 11/1993 | Kaschmitter et al. ......... 361/502 |
| 5,355,234 | A | * | 10/1994 | Kim ............................ 358/512 |
| 5,452,112 | A | * | 9/1995 | Wan et al. .................... 358/504 |
| 5,532,825 | A | * | 7/1996 | Lim et al. ..................... 358/296 |
| 6,465,987 | B1 | * | 10/2002 | Haas et al. ................... 320/128 |
| 6,738,239 | B2 | * | 5/2004 | Petruska ....................... 361/23 |
| 6,778,289 | B1 | * | 8/2004 | Iwata .......................... 358/1.15 |

OTHER PUBLICATIONS von Jouanne, A; Enjeti, P.N.; Banerjee, B.; "Assessment of ride-through alternatives for adjustable-speed drives," Industry Applications, IEEE Transactions on vol. 35, Issue 4, Jul.-Aug. 1999 pp. 908-916.*

* cited by examiner

*Primary Examiner*—Albert W Paladini
*Assistant Examiner*—Carlos Amaya

(57) ABSTRACT

Peripheral devices that have their own power sources. In one embodiment, a peripheral device comprises a processing device, memory, and a power circuit configured to supply power to a peripheral device component, the power circuit including a power source.

30 Claims, 4 Drawing Sheets

PERIPHERAL DEVICE HAVING A POWER SUPPLY

FIELD OF THE DISCLOSURE

The present disclosure relates to peripheral devices. More particularly, the disclosure relates to peripheral devices for use with imaging devices, the peripheral devices having their own power supplies so as not to require an additional external power source.

BACKGROUND

Although imaging devices such as printers, photocopiers, and multi-function peripheral (MFP) devices are generally considered to be "peripheral" devices in that they are normally used with a host computer, such imaging devices are now often provided with their own peripheral devices. For example, printers and photocopiers are often equipped with external paper-handling devices that manage paper from an input or output side of the imaging device. Examples of such paper-handling devices include high capacity input devices, multi-tray input devices, high capacity output bins, multi-tray output bins, and various document finishing devices such as stapling devices, folding devices, etc.

Such peripheral devices typically comprise their own processing and storing capabilities and, therefore, may be thought of as comprising their own internal computers. In order to properly interact with a host imaging device, each peripheral device must be able to communicate with the imaging device. Without such communication, the host imaging device would not be able to utilize the services of the peripheral devices. For example, in the case of an external paper input device, such communications may include instructions from the imaging device as to when and the speed with which to provide paper to the imaging device. In the case of an external stapling device, such communications may include instructions from the stapling device to the imaging device as to if or when the stapling device is out of staples.

Such communications are normally facilitated with external buses. In particular, the imaging device typically connects to one or more peripheral devices through one or more different types of external interfaces such as a Universal Serial Bus (USB), a parallel interface port, a serial data port, or an Infrared Data Association (IrDA) port, or other suitable interface, such as an envelope feeder connection. Many imaging devices also include a powered port that allows a low power external IrDA pod to be connected to the imaging device to enable wireless infrared communications with external users. Although several types of external buses are capable of supplying power to the associated peripheral device, the maximum amount of power that can be provided often is insufficient to operate all components of the peripheral devices. For instance, although this power may be sufficient to enable data processing within the peripheral device, it may be insufficient to operate a drive motor of the device used to convey the print media (e.g., paper). Accordingly, in addition to a data cord, each peripheral device may further require a separate power cord, as well as a power converter.

In that several peripheral devices may be used with a given host imaging device, a large number of cords and/or power converters may be required for a given imaging system. This number is further increased by the data cord(s) and power cord(s) required for the imaging device. In addition to creating cord management challenges, the necessity for these multiple cords and other components increases the cost of the imaging system. Furthermore, problems can arise where there are too few power outlets (e.g., wall outlets) available to accommodate all of the cords and/or where there is inadequate space for an appropriate surge protector.

Recently, other peripheral devices have been developed for use with imaging devices. For example, external color calibrators and external disk drives have been introduced, if these other peripheral devices are added to an imaging system, the number of cords and power converters further increases. From the foregoing, it can be appreciated that it would be desirable to have peripheral devices that include their own power supplies so as to obviate the need for separate power cords and/or power converters.

SUMMARY OF THE INVENTION

Disclosed are peripheral devices that have their own power sources. In one embodiment, a peripheral device comprises a processing device, memory, and a power circuit configured to supply power to a peripheral device component, the power circuit including a power source.

BRIEF DESCRIPTION OF THE DRAWINGS

The invention can be better understood with reference to the following drawings. The components in the drawings are not necessarily to scale.

DETAILED DESCRIPTION

As noted above, each peripheral device used in an imaging system normally requires its own data cable, power cable, and power converter. The number of cables and power converters could be reduced, however, if one or more of the peripherals includes it own power source. Disclosed herein are peripheral devices that include internal power sources that are recharged by the power supplied through the data bus used to communicate with the host imaging device. Through the provision of such power sources, the number of cords and power converters needed in an imaging system is reduced.

Example imaging systems are described herein. Although these systems are described with specificity, they comprise mere embodiments and are not intended to limit the scope of the disclosure. Persons having ordinary skill in the art will recognize that other equivalent embodiments are feasible.

Figure 1:
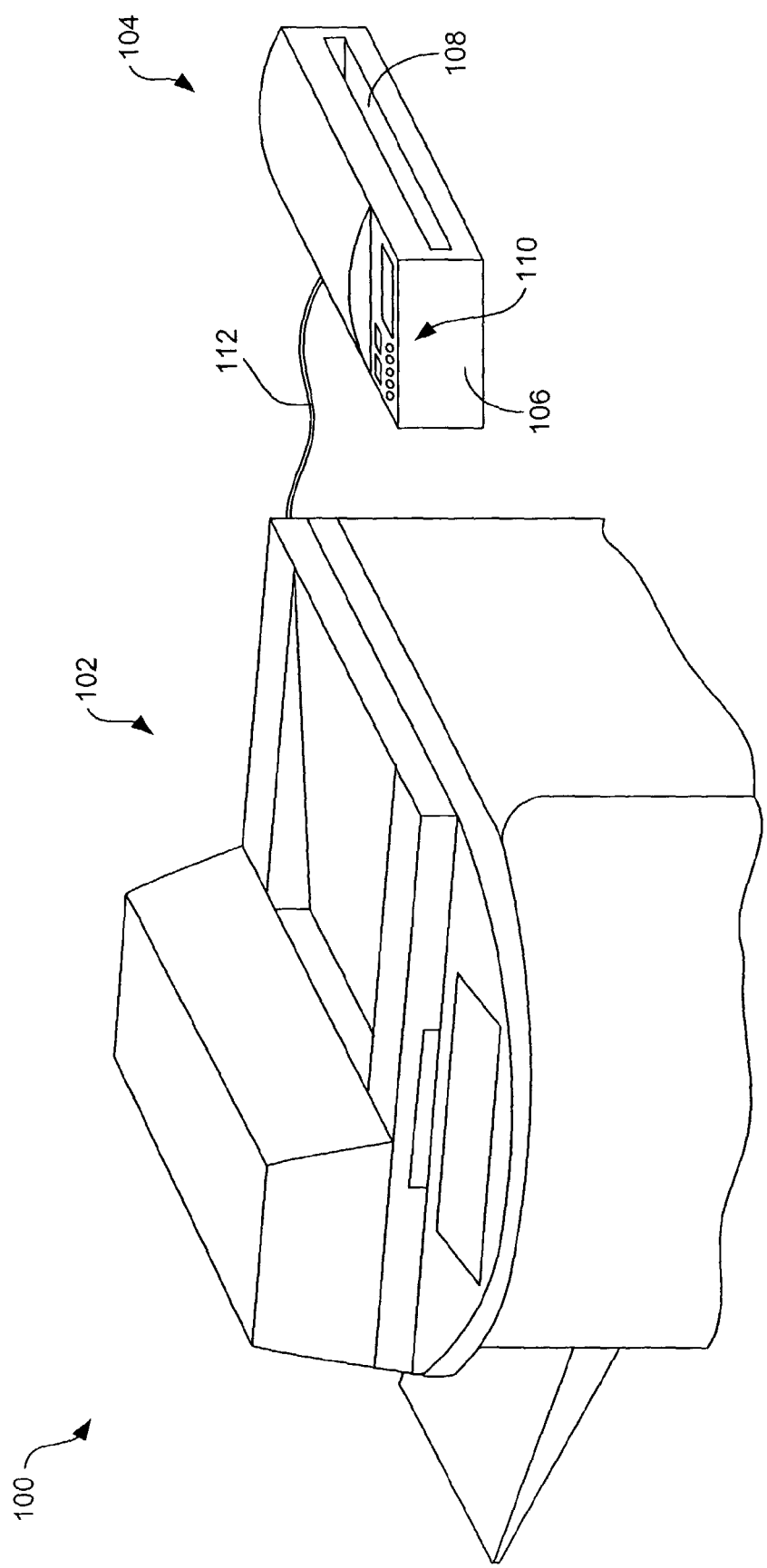
FIG. 1 is a perspective view of an example imaging system that includes a peripheral device having its own power source.

Referring to FIG. 1, illustrated is an example imaging system 100. As indicated in this figure, the system 100 generally comprises a host device 102 and a peripheral device 104. Typically, the host device 102 comprises an imaging device configured to generate hardcopy documents such as a printer, photocopier, facsimile machine, multi-function peripheral (MFP) device, or the like. In FIG. 1, the host device 102 is represented as a printer. More generally, however, the host device 102 comprises any device that is capable of using the services of a peripheral device.

In the system embodiment of FIG. 1, the peripheral device 104 comprises an external color calibrator 106. Although this particular peripheral device is shown and explicitly identified herein for purposes of example, the peripheral device 104 may comprise another type of device. For example, the peripheral device 104 can comprise an external disk drive or wireless data transmission device (e.g., wireless network card). Accordingly, although an external color calibrator is described in detail in the present disclosure, the concepts identified herein may be equally applicable to other such peripheral devices. In addition, although only one peripheral device 104 is shown in FIG. 1, other such peripheral devices may be provided in the imaging system 100. For instance, external paper-handling devices such as a high capacity input device, a multi-tray input device, a high capacity output bin, a multi-tray output bins, and document finishing devices (e.g., stapling devices, folding devices), etc. may further be included in the system 100. These other peripheral devices may or may not include their own power sources.

As shown in FIG. 1, the external color calibrator 106 includes a feed slot 108, through which media (e.g., paper) are input into the calibrator, and one or more buttons or keys 110 with which commands may be entered by a user. The external color calibrator 106 may communicate with the imaging device 102 with a cable 112 that, as described in greater detail below, provides a relatively small amount of power to the calibrator.

Figure 2:
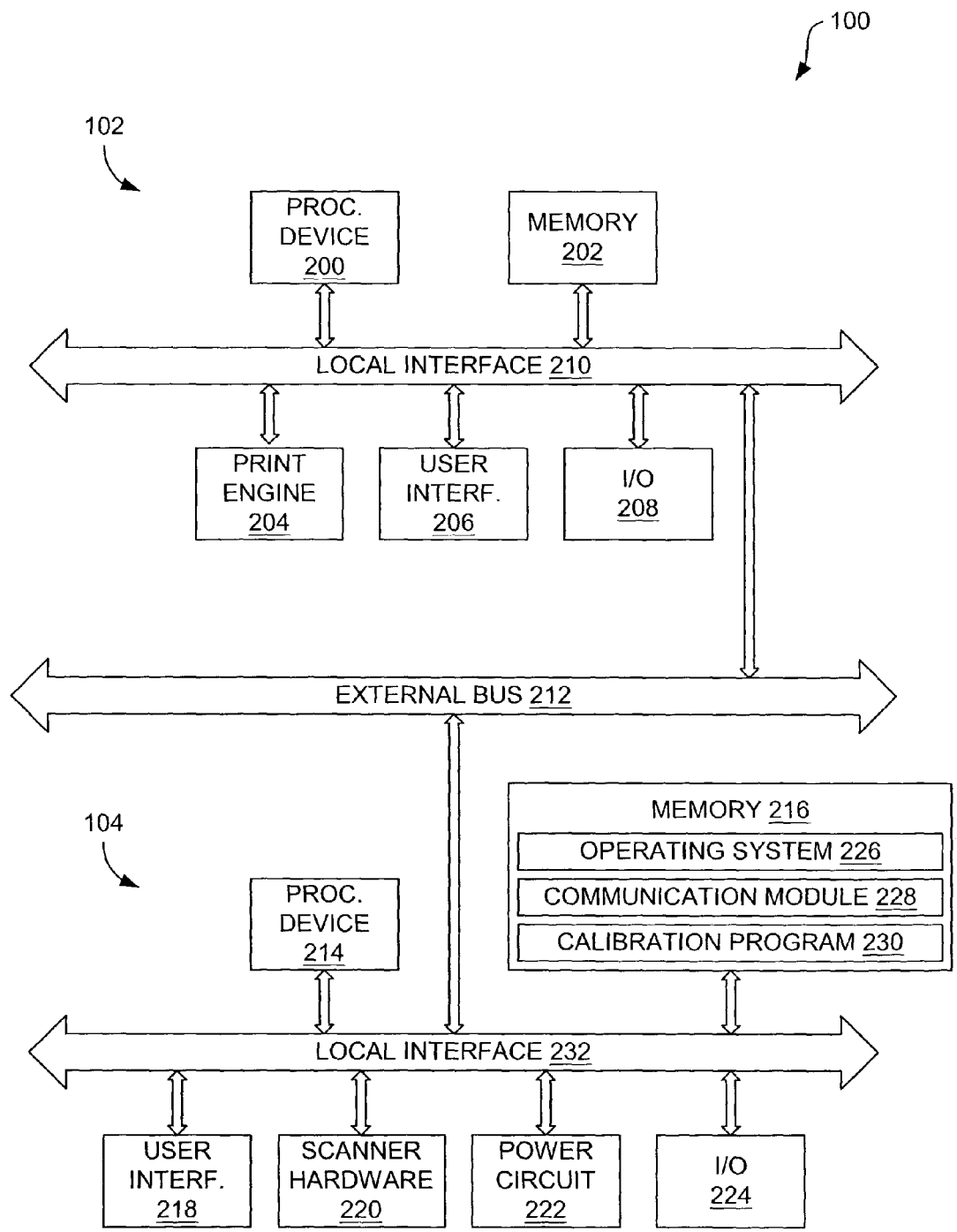
FIG. 2 is a block diagram of the imaging system of FIG. 1.

FIG. 2 is a block diagram that depicts the relationship between the host device 102 and the peripheral device 104. As indicated in FIG. 2, the host device 102 can, for example, comprise a processing device 200, memory 202, a print engine 204, a user interface 206, and one or more input/output (I/O) devices 208, each of which is connected to a local interface 210 that, for instance, comprises one or more internal buses., The processing device 200 is adapted to execute commands stored in memory 202 and can comprise a general-purpose processor, a microprocessor, one or more Application-Specific Integrated Circuits (ASICs), a plurality of suitably configured digital logic gates, and other well known electrical configurations comprised of discrete elements both individually and in various combinations to coordinate the overall operation of the host device 102.

The memory 202 can include any one of a combination of volatile memory elements (e.g., random access memory (RAM, such as DRAM, SRAM, etc.)) and nonvolatile memory elements (e.g., flash memory, ROM, hard drive, etc.). The memory 202 includes various programs (typically firmware) that control operation of the host device 102 such as, for instance, an operating system (not identified).

The print engine 204 comprises the various components with which the host device 102 generates hard copy documents. Accordingly, the print engine 204 can comprise, for instance, a media drive mechanism, a photoconductor drum, a developing roller, fusing system, etc. Alternative hardware may be provided in cases in which the host device 102 is not configured for generating hard copy documents.

The user interface 206 comprises the tools with which the device settings can be changed and through which the user can communicate commands directly to the host device 102. By way of example, the interface 206 comprises a plurality of keys or buttons and a display (e.g., liquid crystal display (LCD)) that may or may not comprise a touch-sensitive screen.

The one or more I/O devices 208 comprise components used to facilitate connection of the host device 102 to other devices. These I/O devices 208 can, for instance, comprise one or more serial, parallel, Small Computer System Interface (SCSI), Universal Serial Bus (USB), IEEE 1394 (e.g., Firewire™), or Infrared Data Association (IrDA) connection devices, or other suitable connection devices (e.g., envelope feeder). In addition, the I/O devices 208 can comprise a component used to transmit and/or receive data over a network. For instance, the I/O devices 208 can include a device that can communicate both inputs and outputs, for instance, a network card, modulator/demodulator (e.g., modem), a radio frequency (RF) or other transceiver, a telephonic interface, a bridge, a router, etc.

Figure 3:
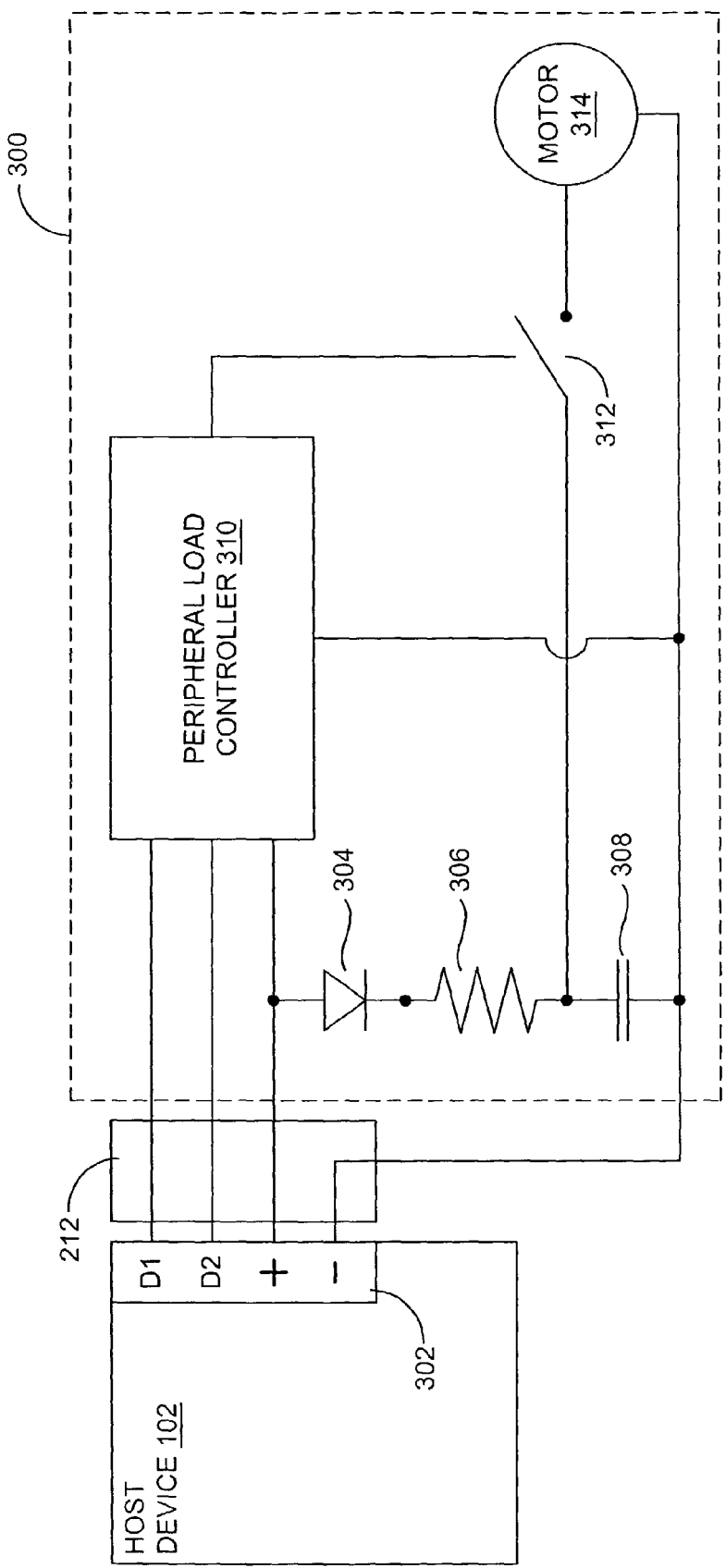
FIG. 3 is a schematic diagram of a first embodiment for a power control circuit shown in FIG. 2.
Figure 4:
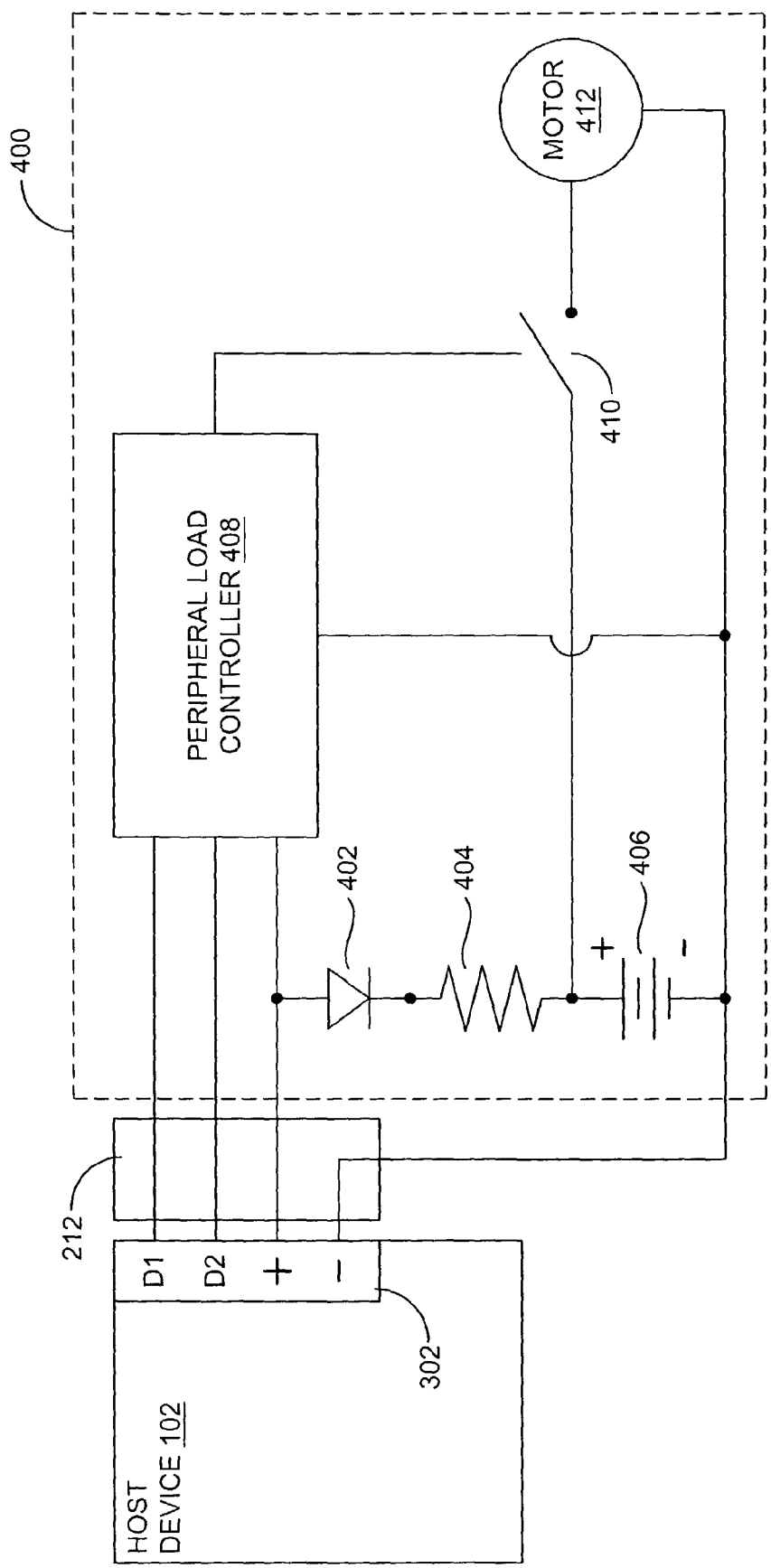
FIG. 4 is a schematic diagram of a second embodiment for the power control circuit shown in FIG. 2.

The peripheral device 104, at least from a computing standpoint, can have a configuration similar to that of the host device 102. Accordingly, the peripheral device 104 can include a processing device 214, a memory 216, a user interface 218, I/O devices 224, and a local interface 232 that have configurations similar to those described above in relation to the host device 102. In addition, however, the peripheral device 104 comprises other components. For instance, where the peripheral device 104 comprises an external color calibrator as in this example, the peripheral device further includes scanner hardware 220 that is configured to scan printed media for the purpose of calibrating the color settings of the host device 102. By way of example, the scanner hardware 220 comprises a drive motor used to draw media through the device, a light source that is used to illuminate the media, an optical system that is used to focus and scan the light across the media surface, and a photosensor that is configured to measure the wavelengths of light reflected off the media. In addition to the scanner hardware 220, the peripheral device 104 includes a power circuit 222 that, as is described in greater detail with reference to FIGS. 3 and 4, is used to power certain components (e.g., the drive motor) of the scanner hardware 220.

The memory 216 of the peripheral device 104 includes an operating system 226 that controls the general operation of the peripheral device and a communication module 228 that facilitates communications with the host device 102. Where the peripheral device 104 comprises an external color calibrator, the memory 216 further includes a calibration program 230 that comprises instructions (e.g., in typically firmware) used to control the scanning hardware 220 and the power circuit 222, as well as to send print jobs to the imaging device 102. Operation of the calibration program 230 is discussed in greater detail below.

As is further indicated in FIG. 2, the host device 102 and the peripheral device 104 are placed in communication with each other via an external bus 212 that comprises, for instance, a USB cable or other cable such as a powered serial data port that is used by a low power IrDA pod.

The programs described above can be stored on any computer-readable medium for use by or in connection with any computer-related system or method. In the context of this document, a computer-readable medium is an electronic, magnetic, optical, or other physical device or means that can contain or store a program (e.g., in the form of a computer program) for use by or in connection with a computer-related system or method. A program can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" encompasses any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

FIG. 3 illustrates a first embodiment 300 for the power circuit 222 of the peripheral device 104 and its connection to the host device 102. As indicated in FIG. 3, the host device 102 includes an interface 302 that, for example, comprises one or more data terminals, D1 and D2, as well as positive and negative power terminals. Provided along a circuit path that in electrical communication with the positive and negative terminals of the interface 302 are a diode 304, a resistor 306, and a power source in the form of a capacitor 308 that are arranged in series. Connected in parallel with those components is a peripheral load controller 310, which may comprise a portion of the processing device 214 identified in FIG. 2, or a separate device. The peripheral load controller 310 is also connected to the data terminals D1 and D2 of the host device interface 302 such that various communications between the host device 102 and the peripheral device 104 can be supported. Further provided in the circuit 300 is a switch 312 that is controlled by the peripheral load controller 310 to turn a drive motor 314 of the scanner hardware 220 on an off. By way of example, the switch 312 comprises a voltage controlled switch.

The power that is continually supplied by the host device 102 via the interface 302 (and the external bus 212) is stored in the capacitor 308 so that power is available for intermittently operating the drive motor 314. Notably, this incoming power may also be used by the peripheral device 104 to operate other components such as the processing device 214, components of the scanner hardware 220, etc. The diode 302 is provided to prevent reverse current flow from the capacitor 308 to the host device 104. The resistor 304 is provided to limit the maximum amount of current that can be supplied to the peripheral device 104 such that the maximum amount of allowable current for the interface 302 is not exceeded. By way of example, this maximum current may only be 100 to 500 milliamps (mA). In such a case, the resistor 306 may have a resistance of, for example, approximately 50 ohms (Ω).

To reduce the physical size of the circuit 300, the capacitor 308 preferably comprises a supercapacitor (or "ultracapacitor") that provides very high capacitance values in a relatively small physical volume. By way of example, the capacitor 308 comprises a carbon aerogel supercapacitor having a capacitance of approximately 1 to 1.5 farads (F) at approximately 5 volts (V), and is contained within a package of approximately 1 to 2 cubic inches in volume. Deemed suitable for use in the circuit 300 are supercapacitors available from Maxwell Technologies of San Diego, Calif. and Cooper Electronic Technologies of Boynton Beach, Fla. Although use of a supercapacitor is preferred to reduce the size of the power circuit 300, conventional capacitors may instead-be used. In such a case, multiple (e.g., 10-20) capacitors connected in parallel may be needed to store the amount of energy required to operate the drive motor 314.

Typically, the drive motor 314 is only driven for a relatively short periods of time. For instance, where the peripheral device 104 comprises an external color calibrator, the drive motor 314 may only need to operate for approximately 5-10 seconds, once every few minutes. Using the relation q=cv=it, the amount of current that can be provided by the capacitor 308 to the drive motor 314 can be determined with the following:

$$i = (c\Delta v)/t \quad \text{[Equation 1]}$$

where i is the current provided by the capacitor, c is the capacitance of the capacitor, $\Delta v$ is the voltage drop experienced by the capacitor as its charge, q, is depleted, and t is the duration over which the current is provided. Assuming a capacitance of 1.5 F, a voltage drop of 1 V (e.g., from 5 V to 4 V), and a duration of 7.5 seconds, approximately 200 mA of current can be provided to the drive motor 314, which is adequate to operate the motor at a speed acceptable for scanning. Due to the availability of this stored energy, external sources of power such as a wall outlet or a separate power cord from the host device 102 are unnecessary. Accordingly, the power cord and power converter normally needed for such a peripheral device may be omitted, thereby reducing clutter created by such items and reducing the cost of the imaging system 100. Moreover, the power constraints of the host device interface 302 are not exceeded, thereby preventing damage to the host device 102.

Although time is necessary to recharge the capacitor 308 after it is used to power the motor 314, this time is relatively short, typically on the order of approximately a minute. Where the peripheral device 104 comprises an external color calibrator, this recharge time does not pose a problem because the motor 314 typically only is operated a few, intermittent times a day. In the typical color calibration scenario, a calibration sequence is initiated with the calibration program 230 so as to cause the calibrator to send a print job to the host device 102. The host device 102 then prints a sheet comprising a plurality of half-tone color "swatches" that are to be analyzed by the calibrator.

The printed sheet is then fed into the external color calibrator (typically by hand) and the drive motor 314 is activated to draw the sheet through the calibrator so it can be scanned. As noted above, the drive motor 314 may need to operate for approximately 5-10 seconds during this scanning. Once scanning is completed, the calibrator analyzes the color swatches printed on the page and sends calibration data through the external bus 212 to the host device 102 so that the color settings (i.e., color table) of the host device can be corrected. At this point, another print job is sent to the host device 102 by the calibration program for the purpose of fine tuning the color setting, and the process described above is again followed. In that time is required for the calibrator to analyze the initially scanned data, send calibration data to the host device 102, for the host device to recalibrate its settings, for the calibrator to then send a second print job to the host device, for the host device to print out the job, and for the user to again load the printed sheet into the calibrator, there is adequate time for the capacitor 308 to be fully recharged. It is noted that, although the power source (i.e., capacitor 308) is described as only powering the motor 314, it can additionally be used to power other components of the peripheral device 104 (e.g., processor, scanner components, etc.), if desired.

FIG. 4 illustrates a second embodiment 400 for the power circuit 222 of the peripheral device 104. The second embodiment power circuit 400 is similar to power circuit 300 shown in FIG. 3. Accordingly, the power circuit 400 includes a diode 402, a resistor 404, a peripheral load controller 408, a switch 410, and a drive motor 412. However, in the embodiment of FIG. 4, the power source comprises a rechargeable battery 406 instead of the capacitor 308. By way of example, the battery 406 comprises nickel cadmium (NiCad), nickel metal hydride (NiMH), or lithium polymer battery having a voltage of approximately 5 V. Although the provision of a rechargeable battery potentially creates environmental and regulatory issues, the use of a battery may be more desirable in some applications. For example, in that little of the stored charge of the battery 406 is depleted during use (e.g., approximately 1%), the battery can provide more power over time, especially in situations in which power is needed on a frequent basis and/or for relatively long durations.

As with the capacitor 308 of the circuit 300, the battery 406 is recharged with the power provided by the host device 102 via the interface 302 and bus 212. Optionally, however, fast chargers (not shown) could be provided where more rapid recharging is desired.

Although a host device 102 having both data terminals and power terminals is shown in FIGS. 3 and 4, in an alternative arrangement the host device may only comprise data and/or control connections with no power lead. In such a case, relatively small amounts of power can be siphoned off the data and/or control lines using the schemes shown in FIG. 3 or 4. In particular, the anode of diode 304, 402 (top end of the diodes as shown in the figures) can be connected to the D1 or D2 line instead of the positive power terminal to obtain power from the line. The resistance of the resistor 306, 404 may need to be adjusted to accommodate this method of charging the power source 308, 406.

In yet another alternative, parasitic power "siphoning" can be used where no power terminal is available. In such a case, a suitably sized coupling capacitor (not shown) can be used to connect the anode of diode 304, 402 to a data, control, or clock line. At predetermined times, energy is coupled into the circuit 300 through a sufficiently fast and lengthy series of voltage pulses of the correct amplitude. By way of example, the peripheral load controller 310, 408 and host device 102 could negotiate active and inactive periods of data transfer. During those periods when the two devices have agreed that peripheral load controller 310, 408 will ignore activity on the D2 line, the host device 102 could rapidly toggle the voltage on the D2 signal line to feed energy through the coupling capacitor to the diode 304, 402. This energy would be stored in the capacitor 308 or battery 406 for later use. Over the many hours each day when the peripheral device 104 is not in use (e.g., 23 hours/day), substantial amounts of energy can be transferred using this method.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A peripheral device for coupling with a host printing device using an external data bus that extends between the peripheral device and the host printing device, the peripheral device comprising:
   a processing device;
   memory;
   a drive motor; and
   a power circuit including a power source configured to be recharged by power collected from the host printing device via the external data bus and to supply power to the drive motor and a diode configured to block a flow of power from the peripheral device to the host printing device along the external data bus;
   wherein, because of the operation of the power circuit, no separate power cord or converter is needed to power the peripheral device.

2. The peripheral device of claim 1, wherein the power source comprises a capacitor.

3. The peripheral device of claim 2, wherein the capacitor comprises a supercapacitor.

4. The peripheral device of claim 3, wherein the capacitor comprises an aerogel capacitor.

5. The peripheral device of clam 1, wherein the power source comprises a rechargeable battery.

6. The peripheral device of claim 1, wherein the external data bus comprises one of a USB cable or a powered serial data cable.

7. The peripheral device of claim 1, wherein the power circuit collects power from a power line of the external data bus.

8. The peripheral device of claim 1, wherein the power circuit collects power from a data line of the external data bus.

9. A peripheral device for coupling with a host printing device using an external data bus that extends between the peripheral device and the host printing device, the peripheral device comprising:
   a processing device;
   memory;
   a drive motor;
   a power circuit including a diode, resistor, and a power source connected in series with each other, the diode being configured to prevent reverse flow of current to the host printing device, the resistor being configured to limit the maximum amount of current that can be supplied to the peripheral device from the host printing device, and the power source being configured to collect power from the host printing device via the external data bus and supply power to the drive motor;
   wherein, because of the operation of the power circuit, no separate power cord or converter is needed to power the peripheral device.

10. The peripheral device of claim 9, wherein the power source comprises a capacitor.

11. The peripheral device of claim 10, wherein the capacitor comprises an aerogel supercapacitor.

12. The peripheral device of clam 9, wherein the power source comprises a rechargeable battery.

13. The peripheral device of claim 9, wherein the external data bus comprises one of a USB cable or a powered serial data cable.

14. The peripheral device of claim 9, wherein the power circuit collects power from a power line of the external data bus.

15. The peripheral device of claim 9, wherein the power circuit collects power from a data line of the external data bus.

16. An external color calibrator for coupling with a host printing device using an external data bus, the calibrator comprising:
   a processing device including a peripheral load controller;
   memory that stores a calibration program;
   scanning hardware including a drive motor configured to convey print media through the calibrator; and
   a power circuit including an internal power source configured to collect power from the host printing device via the external data bus and supply power to the drive motor under the control of the peripheral load controller and including a diode configured to permit a flow of power from the host printing device to the external color calibrator with the external color calibrator coupled to the host printing device;
   wherein, because of the operation of the power circuit, no separate power cord or converter is needed to power the calibrator.

17. The calibrator of claim 16, wherein the power circuit further includes a resistor connected in series with the power source and the diode, the resistor being configured to limit the maximum amount of current that can be supplied to the external color calibrator from the host printing device.

18. The calibrator of claim 16, wherein the power source comprises a capacitor.

19. The calibrator of claim 18, wherein the capacitor comprises an aerogel supercapacitor.

20. The calibrator of clam 16, wherein the power source comprises a rechargeable battery.

21. The calibrator of claim 16, wherein the external data bus comprises one of a USB cable or a powered serial data cable.

22. The calibrator of claim 16, wherein the power circuit collects power from a power line of the external data bus.

23. The calibrator of claim 16, wherein the power circuit collects power from a data line of the external data bus.

24. An imaging system, comprising:
   a host printing device that includes a processing device, memory, and a print engine;
   an external data bus connected to the host printing device; and
   a peripheral device connected to the external data bus so as to be in data communication with the host printing device, the peripheral device including a processing device, memory, drive motor, and a power circuit including an internal power source configured to collect power from the host printing device via the external data bus and intermittently supply power to the drive motor and including a diode configured to permit a flow of power from the host device to the peripheral device with the peripheral device coupled to the host device;
   wherein, because of the operation of the power circuit, no separate power cord or converter is needed to power the peripheral device.

25. The system of claim 24, wherein the power source comprises a capacitor.

26. The system of claim 25, wherein the capacitor comprises an aerogel supercapacitor.

27. The system of clam 24, wherein the power source comprises a rechargeable battery.

28. The system of claim 24, wherein the external data bus comprises one of a USB cable or a powered serial data cable.

29. The system of claim 24, wherein the power circuit collects power from a power line of the external data bus.

30. The system of claim 24, wherein the power circuit collects power from a data line of the external data bus.

* * * * *